United States Patent [19]

Nerwin

[11] 3,745,900

[45] July 17, 1973

[54] FILM ASSEMBLAGE

[75] Inventor: Hubert Nerwin, Rochester, N.Y.

[73] Assignee: Eastman Kodak Company, Rochester, N.Y.

[22] Filed: Jan. 13, 1972

[21] Appl. No.: 217,619

Related U.S. Application Data

[63] Continuation of Ser. No. 52,028, July 2, 1970, abandoned.

[52] U.S. Cl. .......... 95/19, 96/76 R
[51] Int. Cl. .......... G03b 19/10
[58] Field of Search .......... 95/13, 19, 22, 89 R; 96/76 R

[56] References Cited

UNITED STATES PATENTS

| | | | |
|---|---|---|---|
| 3,650,751 | 3/1972 | Huber | 96/76 R |
| 3,113,496 | 12/1963 | Eburn et al. | 95/13 |
| 3,433,636 | 3/1969 | Hamilton | 96/76 R |
| 3,080,805 | 3/1963 | Hamilton | 95/13 |
| 3,132,572 | 5/1964 | Downey | 95/13 |

*Primary Examiner*—Fred L. Braun
*Attorney*—W. H. J. Kline and J. Addison Mathews

[57] ABSTRACT

An assemblage of "self-processing" photographic film units and leaders. The film units include photosensitive and processing elements arranged in separate stacks permitting sequential exposure of the photosensitive elements. The leaders serve to interconnect both the photosensitive and processing elements of each film unit and the respective film units. Only one leader extends from the assemblage at the time of each exposure and this one leader is adapted to be pulled from the assemblage to superpose the exposed photosensitive elements with its respective processing element, to transport that superposed unit from the assemblage and between a pair of pressure-applying members, and to advance a leader from the next successive unit to a position between the pressure members where it can be grapsed for superposing and transporting that next successive unit after its exposure.

11 Claims, 14 Drawing Figures

HUBERT NERWIN
*INVENTOR.*

BY J. Addison Mathews
Robert W Hampton
ATTORNEYS

HUBERT NERWIN
INVENTOR.

BY J. Addison Mathews
Robert W. Hampton
ATTORNEYS

HUBERT NERWIN
INVENTOR.

BY J. Addison Mathews
Robert W. Hampton
ATTORNEYS

HUBERT NERWIN
INVENTOR.

BY J. Addison Mathews
Robert W. Hampton
ATTORNEYS

FILM ASSEMBLAGE

This application is a continuation of U.S. application Ser. No. 52,028, filed July 2, 1970 now abandoned.

BACKGROUND OF THE INVENTION

1. Field of the Invention

The present invention relates to assemblages of "self-processing" photographic film units, and to leader systems for transporting film units from such assemblages.

2. Description of the Prior Art

It is well known in the photographic arts to supply pre-cut film units in packs that include one or more leaders cooperating with each of the units to facilitate their handling in photographic apparatus. Most modern commercial cameras of conventional types now use film supplied in the more easily handled rolled or spooled form, but certain attributes unique to the pack, and well known to those skilled in the art, still make it a preferred form of supply in certain specialized applications, such as self-processing photography.

When intended for use in such pre-cut or pack forms of supply, self-processing film units generally include a photosensitive element and a process sheet or spreading element. The photosensitive element preferably comprises one or more layers of a photosensitive silver-halide, that can be exposed for recording a processable latent image; while the process sheet or spreading element is adapted to be superposed with the photosensitive element for aiding in the processing of that latent image. The final print usually is produced by image-forming substances that are transferred as a result of such processing.

In one form, with which the present invention will be described, a plurality of photosensitive and spreading elements are provided in separate stacks, permitting exposure of each photosensitive element while it is spaced apart from its corresponding spreading element, and thereafter the photosensitive and spreading elements are moved into superposition between a pair of pressure-applying members usually associated with a camera. The processing composition is located in a container adapted to be positioned between the elements when they pass between the pressure-applying members such that the members will rupture the container and spread the composition in a layer of predetermined thickness between the elements.

Cameras adapted for use with film units of the above type generally comprise a storage area or chamber for receiving a plurality of the film units, preferably contained in a cartridge, and a pair of juxtaposed pressure-applying members between which the photosensitive and second elements of the unit can be moved after exposure for superposing the sheets, rupturing the container and spreading the processing composition.

Various expedients have been suggested for manipulating the film units within the camera, and for transporting the units between the pressure-applying members. In mechanisms of the type with which the present invention is most closely related, one or more leaders have been attached to the film units both for connecting the spaced apart photosensitive and second elements, and for extending between the pressure-applying members so the units can be drawn, one at a time, between the members. In one form, illustrated, for example, in U.S. Pat. No. 2,854,903, issued Oct. 7, 1958, the pressure-applying members are spaced apart before (or after) each exposure to permit threading of a leader connected to one of the film units between the spaced members. The members are then brought into closed or pressure-applying positions on opposite sides of the threaded leader for rupturing the container and spreading the composition as the film unit is pulled from the camera by the threaded leader. While this form of mechanism operates successfully, the threading operation must be done before (or after) each exposure for each time a film unit is withdrawn between the members. Moreover, since that part of the apparatus that supports the pressure members must be opened while film is in the camera, light seals must be provided between the members and the remaining film units then in the camera.

Another suggestion that eliminates the necessity for threading leaders each time a film unit is to be processed is disclosed in U.S. Pat. No. 2,834,269, issued May 13, 1958. In this latter case leaders from all of the film units then remaining in the camera extend between the pressure-applying members, and the compressive pressure from the members is applied to a respective film unit through the leaders of the remaining film units as the respective film unit being processed is drawn between the pressure-applying members and between said other leaders. In this type of mechanism, a plurality of leaders extend between the pressure members whenever more than one film unit is positioned in the camera, and it is possible that a wrong leader will be pulled, thus wasting at least one film unit and possibly jamming the camera. Moreover, two leaders are required for each film unit (one each for the photosensitive and spreading elements) and there is considerable likelihood that they will not always be pulled correctly in unison, again wasting at least one film unit. Still further, it is very difficult to apply an even and constant amount of pressure against each of the film units as it is moved between the rollers for processing because the members must exert their force against the respective film unit being processed through the leaders of the other remaining film units, and because the number of such leaders changes as each film unit is processed.

In yet another example, illustrated in U.S. Pat. No. 2,477,304, issued July 26, 1949, each film unit or photosensitive and second elements are connected by a single leader to the preceeding film unit, such that the leader of a film unit next successive to the unit being processed automatically will be withdrawn between the pressure-applying members at the same time the last mentioned unit is withdrawn between the members. This last-mentioned type of leader mechanism overcomes many of the disadvantages set forth above, but also suffers from at least several other objections. For example, after each such automatic threading of a next successive leader, it still must be manually disconnected from the unit being processed. Also, with many types of film units, such as those disclosed in connection with the preferred embodiment of the present invention, leader connections in the locations disclosed in the lastmentioned patent can leave pressure marks in the final print, as will be described more fully hereinafter. Moreover, the leader system disclosed in said patent does not include connecting leaders suitable for coupling separated photosensitive and spreading elements of a single film unit.

More recently, and in order to overcome many of the problems in handling film units associated with leaders of the above-described types, a two-step system has been developed as illustrated in U.S. Pat. Nos. 3,079,847 issued Mar. 5, 1963 and 3,161,122 issued Dec. 15, 1964. In mechanisms of this last mentioned type, each film unit is provided with two different film transporting leaders that operate substantially independently and require two different pulling operations to completely withdraw each film unit from the camera. The units are substantially independent or unconnected as supplied within the pack, and each includes a first leader or pull tab extending to the camera exterior at a first location and a second leader that is advanced from the assemblage and between the pressure-applying members by pulling on the first leader. This second leader then must be grasped and withdrawn from the camera before the complete film unit is transported between the pressure-applying members and from the camera. Without going into detail regarding various problems with this type of mechanism, only the inconvenience of a two-stage operation and the necessary relative complexity of the cooperating camera mechanism will be mentioned.

Examples of still other types of film advancing mechanisms are disclosed in U.S. Pat. Nos. 3,108,525; 3,002,437; 2,909,977 and 2,880,660.

SUMMARY OF THE INVENTION

In accordance with the present invention, a film assemblage is provided including a plurality of film units and leaders for transporting the units between pressure-applying members of associated photographic apparatus. Only one leader extends from the assemblage after each exposure of a film unit, and that leader is adapted to be pulled to advance the exposed unit between the pressure-applying members. The other leaders are arranged within the assemblage to intercouple the exposed and other film units such that pulling of the exposed film unit from the assemblage automatically will advance or thread a leader of the next successive film unit between the pressure-applying members. The newly advanced leader then automatically is stripped from the preceding film unit and is positioned, without intervention by the camera operator, in a location where it can be grasped for pulling the next film unit between the pressure-applying members. In accordance with one feature of the present invention, the film units include photosensitive and second elements that initially are separated to permit exposure of the photosensitive elements, and the above-mentioned leaders also serve to effect the superpositioning of these elements automatically and at the same time they are transported between the pressure-applying members. However, in accordance with other features, the invention can be utilized with units wherein such superpositioning may not be required.

It is an object of the present invention to provide an assemblage of film units and leaders wherein each unit requires only a single withdrawal operation to initiate processing.

It is a further object of the invention to provide an assemblage of the above type wherein only one leader extends from the unit just prior to processing.

A still further object of the present invention is to provide an assemblage of the above type wherein a leader of the next successive film unit is advanced to a position where it is available from the camera exterior as each exposed unit is withdrawn from the camera.

Yet another object of the present invention is to provide an assemblage of the above type in which the leader of the next successive unit automatically is stripped or disconnected from the exposed unit when the latter is completely withdrawn from the assemblage.

The invention, and its objects and advantages, will become more apparent in the detailed description of the preferred embodiment presented below.

BRIEF DESCRIPTION OF THE DRAWINGS

In the description of the preferred and alternative embodiments presented below, reference is made to the accompanying drawings, in which.

DESCRIPTION OF THE PREFERRED AND ALTERNATIVE EMBODIMENTS

Because film packs and cooperating cameras are well known, the present description will be directed in particular to elements forming part of, or cooperating directly with, the present invention. Camera, film and pack elements not specifically shown or described herein should be understood as selectable from those known in the art.

Figures 1, 2, 3, 4:
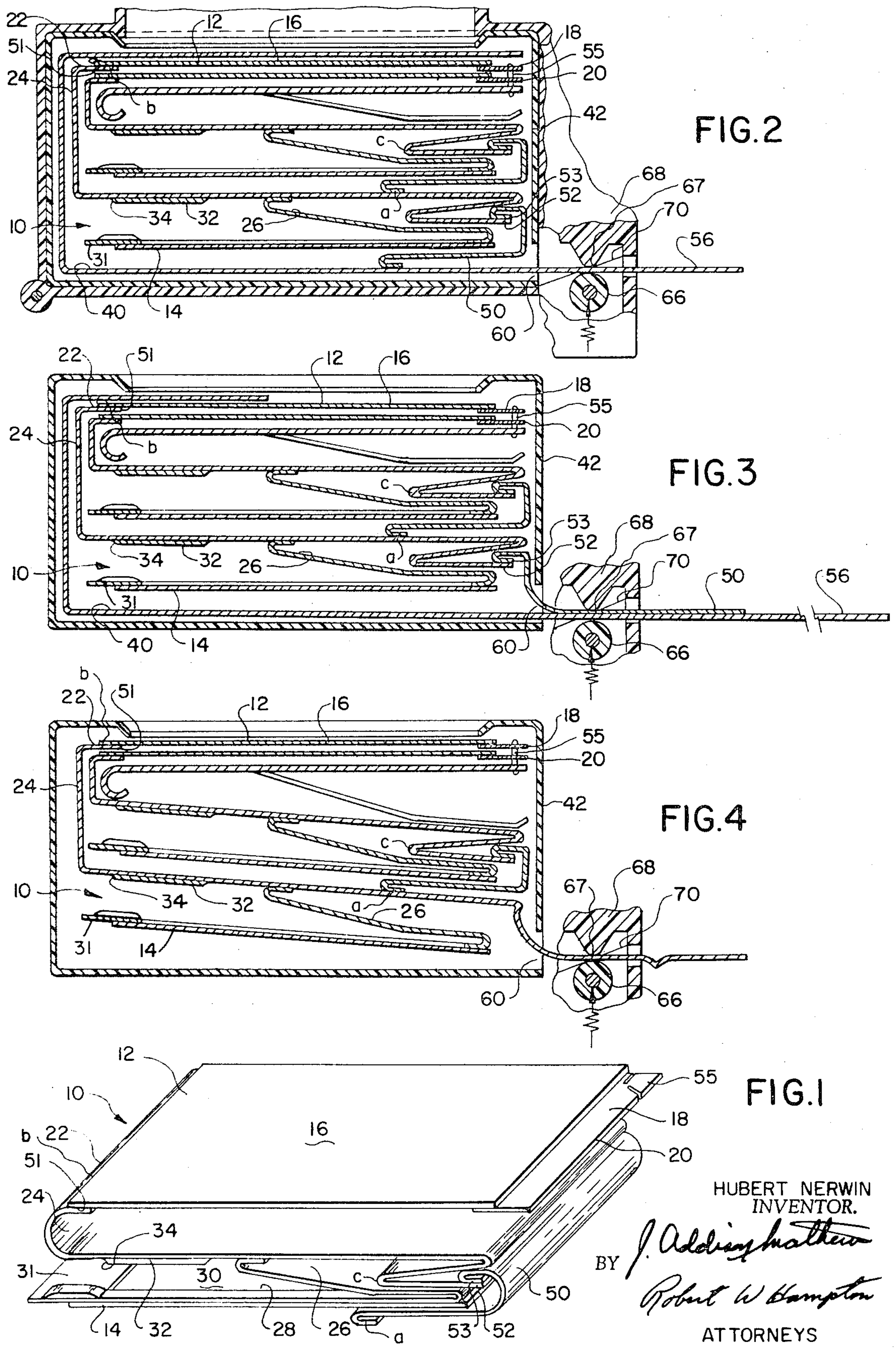
FIG. 1 is a pictorial view of a single film unit with accompanying leaders in accordance with the present invention.
FIGS. 2–4 are exaggerated cross-sectional views of an assemblage of film units with accompanying leaders in accordance with FIG. 1, and illustrating the positions of the units and leaders during various stages of withdrawal of a protective or light-tight cover surrounding the film units.

Film units of the type with which the present invention is employed may take any of a variety of forms, one of which is illustrated in FIG. 1 of the drawings, wherein the thickness of the materials comprising the film units are exaggerated for purposes of clarity of illustration. The film unit, generally designated 10, comprises a photosensitive element 12, and a second composition-spreading or process element 14. In the preferred form, and as will be described more completely hereinafter, the final image may be transferred to or formed in this second element during processing, and it therefore is sometimes referred to as the print-receiving or positive element. However, in other forms, also usable with the present invention, the image remains in the photosensitive element, and the process element then generally serves only in its processing function and as a protective outer barrier. Both the photosensitive and second elements are in the form of pre-cut individual sheets adapted to be separated during exposure but to cooperate in superposed relationship during processing. The photosensitive element defines a first or exposure portion 16, and includes a trailer sheet or skirt 18 defining the trailing end 20 of the photosensitive element. Exposure portion 16 comprises a layer of photosensitive material, preferably containing a photosensitive heavy metal salt such as silver halide, carried on a suitable support, such as paper or one of the organic plastic materials including cellulose acetate and the like commonly used for film base. The trailer sheet 18 comprises thin sheet material such as paper which is preferably substantially thinner than the overall thickness of the photosensitive portion 16, and, as will be described more fully hereinafter, is adapted to mate with the second or process element to define a trap for any excess of the fluid composition. A leading end 22 of the photosensitive element is coupled to a leader or first connecting and advancing element 24 as also will be described more full hereinafter.

The second and process or print-receiving element 14 comprises a second planar sheet similar in shape to the photosensitive element and at least coextensive with the area or exposure portion 16 thereof. In the preferred form shown, the print-receiving sheet is of substantially the same width and length as photosensitive element 12 and is mounted on a second or connecting leader and carrier 26 which, like trailer 18 and leader 24, is formed of thin sheet material such as paper that is comparatively thin yet strong. The print-receiving sheet is mounted on the side of the carrier sheet opposite the side thereof which is intended to be superposed with the photosensitive element and at a position intermediate the ends of the carrier sheet. Carrier sheet 26 is provided with an aperture 28 (FIG. 1), preferably rectangular, overlying print-receiving sheet 14 and defining a print-receiving frame or portion 30 thereof in contact with which a liquid processing agent is spread and in which a transfer print is formed.

Within the frame 30, the second or process element 14 preferably comprises an image-receiving layer carried on a suitable support. The support may be of any suitable sheet material such as paper and organic plastic materials used for photographic films and prints, the choice of material depending on the manner in which the print is to be viewed, that is by reflected or transmitted light. The image-receiving layer comprises a material layer formed on the support as a stratum of the support for receiving and/or supporting the transfer image formed as a result of development of a latent image in the photosensitive sheet. Carrier sheet 26 also includes a trailing end section or skirt 31 which, in the form shown, is substantially equal in length to the trailer sheet 18 of the photosensitive element.

The photosensitive element, following exposure, is adapted to be superposed with the print-receiving element, and the two elements are moved in superposition between a pair of pressure-applying members for spreading a fluid processing composition in a thin layer between the photosensitive and print-receiving portions of the two elements. In the form shown in the drawing, the processing composition is provided in a rupturable container or pod 32 attached to leader 24 on the side thereof facing the print-receiving element and adjacent to the leading end of the photosensitive element. Container 32 preferably is formed of an elongated rectangular blank of a multilayer sheet material which is impervious to air and the fluid processing composition. The blank is folded longitudinally upon itself and the end and longitudinal margins thereof are sealed to one another to form a cavity in which a predetermined quantity of the processing composition is contained. The longitudinal edge seal of the container is designated 34 and is weaker than the two end seals so that the application of compressive pressure to the walls of the container will cause rupture of the longitudinal seal and unidirectional discharge of the fluid contents of the container. Container 32 is mounted with longitudinal sealed portion 34 extending transversely of the photosensitive element near the leading edge of photosensitive portion 16 so that the application of compressive pressure to the container through leaders 24 and 26 will cause the discharge of the contents of the container in the direction of the photosensitive and print-receiving portions 16 and 30 between which said fluid is to be spread. For best results, the fluid-carrying cavity of the container should be substantially equal in length to the width of said portions so that the fluid contents of the container will be released therefrom in an elongated mass extending substantially from edge to edge of said portions.

The film unit, in one form, may comprise material for effecting the formation of a positive print in single or multicolors by a silver transfer reversal process. In a three-color system the photosensitive element includes three silver halide emulsion layers, one each having a predominant sensitivity to blue, green, and red light, respectively. Each silver halide emulsion layer has associated therewith a dye-image providing material possessing a spectral absorption range substantially complementary to the predominant sensitivity range of its associated emulsion; i.e., the blue-sensitive silver halide emulsion layer will have a yellow dye image-providing material associated therewith, the green-sensitive silver halide emulsion layer will have a magenta dye image-providing material associated therewith, and the red-sensitive silver halide emulsion layer will have a cyan dye image-providing material associated therewith. The dye image-providing material associated with each silver halide emulsion layer may be contained either in the silver halide emulsion itself or in a layer contiguous to the silver halide emulsion layer. As described more fully in commonly assigned U.S. Pat. application, Ser. No. 027,990, entitled PHOTOGRAPHIC FILM UNIT FOR DIFFUSION TRANSFER PROCESSING, filed on Apr. 13, 1970 in the name of Harold E. Cole and now abandoned, the dye image-providing materials may be non-diffusible couplers capable of reacting with oxidized color developing agent to produce diffusible dyes. Other dye image-providing materials can also be employed in film units useful in the present invention including dye developers, coupling dyes, etc.

The processing composition employed in the rupturable container is a conventional aqueous solution of an alkaline material, e.g., sodium hydroxide, sodium carbonate or an amine such as diethylamine, preferably possessing a ph in excess of 12, and an aromatic primary amino color developing agent such as a p-phenylenediamine developing agent. The solution also preferably contains a viscosity-increasing compound such as a high-molecular weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about one to about five percent by weight of the processing composition is preferred which will impart thereto a viscosity of about 100cps. to about 200,000cps. The processing composition is adapted to diffuse into the photosensitive element to either effect or initiate imagewise development of the silver halide emulsion layers. Imagewise distributions of diffusible dye image-providing material are formed as a function of the imagewise exposure of each said silver halide emulsion layer. At least a portion of the imagewise distributions of diffusible dye image-providing material diffuse to the image-receiving layer, in this case in the processing or second element, to produce a positive dye image. The second element then may be stripped away from the photosensitive layer to provide a right-reading image on an opaque reflecting layer background.

The respective elements of the film unit described above are selected, pre-cut, and designed to provide a pleasing aesthetic appearance and preferably are stiff enough for suitable handling both within and outside the camera. On the other hand, the structure is sufficiently flexible for manipulation by camera mechanisms and is sufficiently resilient to recover from any normal flexing.

As previously noted, the photosensitive element is exposed within the housing of the camera or other apparatus and is thereafter superposed with the second element for movement, commencing in the region of the leading ends, between a pair of pressure-applying members for first rupturing the container, and then for spreading the fluid contents of the container in a layer between the elements to form a sandwich. As this sandwich is formed, it is removed from the camera or apparatus directly into the light. Further exposure or fogging of the photosensitive layer is prevented by providing the supports for the photosensitive element 12 and second sheet 14 with a layer or coating of material that is opaque to light actinic to the photosensitive emulsion layers of element 12. As the fluid processing agent is distributed between the two sheets it functions as an adhesive for holding the photosensitive and second sheets in superposition. Prevention of the exposure of the photosensitive sheet by light entering between the margins of the sheet can be further assured by providing a light absorbing dye or pigment in the fluid processing agent.

The photosensitive and second elements of film assembly 10 are secured to one another by leaders to form a single unit, which, along with one or more other units, may comprise the film assemblage. The film units in the assemblage are arranged with the photosensitive elements in one stack and the second elements in another stack separate from the stack of photosensitive elements. The photosensitive and second or print-receiving elements of the first film unit are disposed outermost relative to the other units in the assemblage, and it is the outermost film unit which is intended to be exposed and processed first with the photosensitive and second or print-receiving sheets of subsequent film elements being arranged inwardly from the first film unit. A removable dark or light blocking cover or sheet 40 surrounds all of the units of the assemblage as supplied to protect the assemblage against premature exposure prior to being inserted into the camera, and, in the preferred form, this entire assemblage including the dark sheet is housed within a suitable cartridge 42.

Each film unit in the assemblage has leader means associated therewith both for coupling the photosensitive and second elements of each of the units and for coupling respective ones of the film units to the next adjacent film unit or to the light protective cover sheet. As will be described more fully hereinafter, this leader means is manually operative sequentially to effect the initial movement of each of the photosensitive and second elements into correctly registered superposition and then the further movement or transport of the resulting sandwich between the pressure-applying members and from the camera. Only one sheet of the leader means extends from the assemblage both before removal of the dark sheet and at the times after each exposure when the exposed unit is intended to be withdrawn from the assemblage, threading between the pressure-applying members of a leader sheet associated with the next successive unexposed film unit being effected automatically as the aforesaid one sheet and its associated exposed film unit are withdrawn from the assemblage. Stripping the newly threaded leader sheet from the one sheet and its exposed film unit then is effected automatically by a peel joint, leaving the newly threaded leader in a position where it may be grasped for processing the next successive unit.

Referring first to FIG. 1 and to a respective one of the film units, the leader means generally comprise first, second and third leader elements or sheets 24, 26 and 50, respectively. The first leader sheet 24 is longer than either the photosensitive or print-receiving element by about half as much again and is securely connected at one end 51 to the leading end 22 of the photosensitive element, from which it extends between the photosensitive and second or print-receiving elements toward the trailing or skirted end 20 of the photosensitive element, at which general location it is folded back upon itself once and then again to form an accordian or Z-shaped configuration ending at 52 and located entirely within the confines of that one film unit. The second leader sheet 26 is securely attached to the first leader sheet at a point midway between the leading and trailing ends of the photosensitive and second or print-receiving elements, from which point it extends between the first leader sheet and the second or print-receiving element, to the leading end of the latter, and at which general location it is securely attached to the print-receiving element. In order to insure proper superpositioning of the elements, the second leader sheet has a length from its one end attached to the first leader sheet to its point of attachment to the leading end of the second or print-receiving element, that is equal to the length of the first leader sheet from the point of connection between the first and second leader sheets to the leading end of the photosensitive sheet. The third leader sheet 50 is strippably coupled at 53 to the foremost or leading end 52 of the first leader sheet 24 and extends therefrom around the leading edge of the second or print-receiving element 30 to a position adjacent to the outermost surface of that element, where it is folded back upon itself for a secure connection to the next successive film unit. In some instances it might be more logical to consider the third leader sheet as part of the next film unit, since it it only strippably coupled to the unit presently being described. However, for purposes of convenience of illustration, this third leader sheet will be described in the form illustrated in FIG. 1.

As will become more apparent hereinafter, the strippable connection 53, often referred to as a peel joint, may comprise an adhesive coupling that is relatively strong in shear but comparatively weak in tension, so that the application of a pulling force tangential to a plane defined by the leading end of first leader sheet 24 will advance that leading end from the assemblage and between the pressure members, but thereafter, any substantial resistance by the film unit to further withdrawal will tend to effect a folding or peeling away of the third leader sheet 50, from first leader sheet 24, and the resulting application of tensile forces to the adhesive connection will cause separation of said third and first leader sheets. This peeling effect does not occur earlier (i.e. while the peel joint is still in the camera) because the compressive forces exerted by the assemblage, the pressure members, and the camera exit resist any substantial folding or peeling away at the joint of the third leader sheet from the first leader sheet, and, perhaps even more important, because the excess material of the first leader sheet stored in the double or Z-fold offers no substantial resistance to being threaded by the third leader sheet. After threading, however, when the excess material in the double or Z-fold is fully extended, the forces tending to separate the peel joint substantially increase due to the fact that further movement of the first leader sheet cannot occur without moving its associated film unit. The increased size and rigidity of the film unit, as compared to the leaders, probably would resist movement sufficiently to cause peeling apart of the joint, but to even further assure separation, one end of the photosensitive element of each film unit is stapled through a pre-weakened corner at 55 to a normally stationary portion of the assemblage or cartridge. Thus, after the first leader sheet is fully extended, and at the proper time for separation of the third and first leader sheets, the forces tending to cause peeling of the joint increase substantially.

This type of strippable connection is particularly advantageous because separation may be effected by continued pulling on the leader in the same direction (tangential to the leader) that it is pulled to advance the film unit. Stripping is automatic and it is not necessary for the camera operator to take any special precautions or actions to insure its occurrence.

While the leaders have been described above and illustrated in terms of first, second and third elements, it should be understood that different arrangements also could be used in accordance with the present invention. For example, one leader sheet could extend between the leading ends of the photosensitive and second elements and a second leader could be attached to and extend from the mid-point thereof to define the double or Z-shaped fold of extra material. Moreover, the first and third leader sheets could be combined into a single sheet and the strippable or peel connection could be located between that resulting combined leader and the leader of the next preceeding film unit.

In the preferred embodiment all of the leader sheets are of equal width, and in turn are equally as wide as the photosensitive and print-receiving elements, or at least the exposure and print-receiving portions thereof. It is also possible, however, that the third leader sheet and the end portion 52 of the first leader sheet (that foremost part from the end to the first fold) could be narrower than the other leader sheets or even tapered without affecting picture quality. Such a narrower third leader might result, for example, in more consistantly proper folding or bending of the third leader sheet as it is withdrawn from the assemblage in a manner described hereinafter. In this connection, however, it should be pointed out specifically that any leaders extending between the pressure-applying members at the same time a film unit is withdrawn between the members ordinarily must be equal to or greater in width that the picture-forming portions of the unit. Otherwise, the varying thickness of the materials between the members will leave pressure marks in the finished print. These pressure marks will not occur, however, where only the third leader sheet and the abovementioned end of the first leader sheet are of narrow gauge, since these portions pass entirely between the pressure-applying members before any portion of the film unit. The particular point on the leader beyond which full width must be present is determined by the distance between points *a* and *b* (FIG. 2), which must be equal to or greater than the distance between *a* and *c*, where *c* is the point of full width.

The cover sheet 40 has no separate leaders in its preferred form, but defines an integral leader or leading end 56 similar in function to the first leader sheet of each film unit. For this reason the leading end portion of the cover sheet, or the cover sheet itself, sometimes is referred to as a leader sheet or element.

Referring now to an assemblage of film units, and as illustrated in FIGS. 2–7, the end of the third leader element 50 opposite from the first leader element 24 is securely attached to the first leader element of the next preceeding film unit in the assemblage, or to the cover sheet, and is adapted to be withdrawn from the assemblage by and at the same time that next preceeding unit or cover sheet is withdrawn. In this same manner each film unit is connected to a preceeding unit and the outermost unit is connected to the cover sheet.

In the preferred embodiment the assemblage is adapted to be supplied in a cartridge 42 and the first leader of the assemblage is adapted to be threaded through an exit 60 in the cartridge and between a pair of juxtaposed pressure-applying members 66 and 67, respectively, in photographic apparatus such as a camera represented at 68 in FIG. 2. For this purpose the pressure-applying members are adapted to be spaced apart at parting line 70 at the time the assemblage is placed in the camera to facilitate manual threading of the foremost leader of the assemblage (or the dark slide) between the members. The pressure members then are moved into and latched in their closed or pressure-applying position juxtaposed on opposite sides of the leader.

Referring now to the operation of the preferred embodiment, and first to FIG. 2, the assemblage is illustrated as it ordinarily would appear in a camera immediately after loading of a cartridge containing the assemblage into the camera. As depicted in FIG. 2, only the leader or leading end of the cover sheet projects from the confines of the assemblage and the pressure members.

The assemblage is prepared for a first exposure by pulling on the leader or leading end of the cover sheet to withdraw the sheet from the assemblage. This presents the photosensitive element of the first or outermost film unit for exposure and concurrently advances the third leader sheet of that first film unit from the assemblage and between the pressure-applying members. Since the third leader is securely attached to the dark slide, but is only strippably coupled to the first film unit, it will be stripped from the film unit and completely withdrawn from the assemblage for disposal with the dark slide. The strippable connection has sufficient strength, however, to withdraw the leading end portion of the first leader sheet between the pressure-applying members before the third leader sheet is stripped from the first leader sheet. Thus, the leading end of the first leader sheet will be left in a position exterior of the pressure-applying members, as illustrated in FIG. 4, where it may be grasped for pulling that film unit from the assemblage and between the members.

Figure 5:
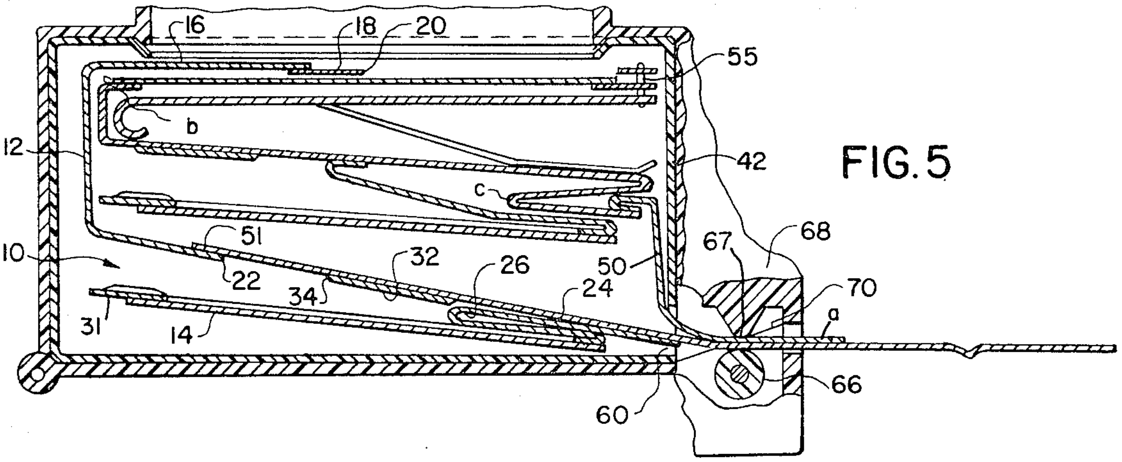
FIGS. 5–7 are exaggerated cross-sectional views of the film assemblage illustrated in FIGS. 2–4, but depicting the units and leaders in various stages during withdrawal of the first film unit.
Figure 6:
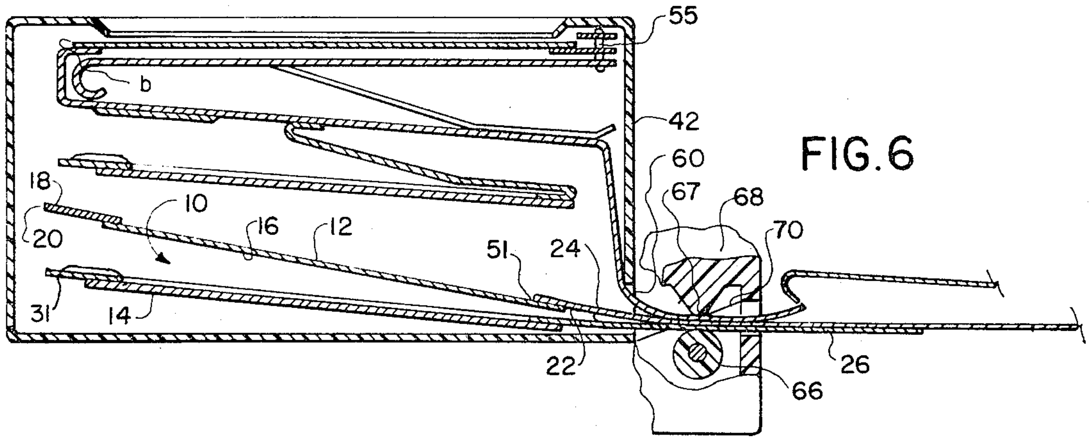
Figure 7:
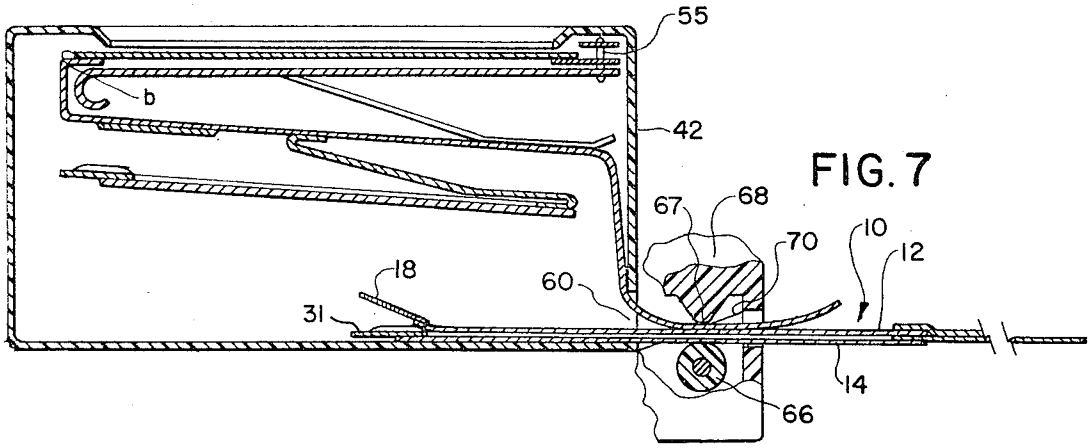

Referring now to FIGS. 5–7, various stages during withdrawal of the first film unit have been illustrated. In FIG. 5 the leading end of the first leader sheet has been pulled partially from the assemblage to advance the exposed photosensitive sheet toward its position for registration with the second or print-receiving element. During this initial movement of the photosensitive element, the second or print-receiving element remains stationary and the second leader sheet, interconnecting the photosensitive and second elements through a portion of the first leader sheet, folds upon itself until it is fully extended in a direction opposite to its original direction in the assemblage. At this time, and as determined by the length and position of connection of the second leader sheet, the photosensitive and second or print-receiving elements are in proper registration or superposition. Continued pulling of the first leader element from the assemblage then will transport the superposed sheets as a sandwich between the pressure-applying members and from the camera. At some time prior to entry of the photosensitive and second elements between the members, and in the manner similar to that described above in connection with the dark slide, the leading end portion of the first leader sheet of the next successive film unit will be threaded between the pressure-applying members and stripped from the exposed film unit as illustrated in FIG. 6. The time at which this leader threading is completed is important for reasons mentioned above in connection with pressure marks on the finished print. Since this leader is at least as wide as the imaging areas on the photosensitive and second sheets, it does not substantially affect processing of the sheets even though it remains between the pressure-applying members at the time the exposed film unit is drawn therebetween. Moreover, since only one such element is between the pressure-applying members during processing of each film unit, and since these one elements are all of the same dimension, their effect on spreading of the composition may be taken into account in the design of the apparatus.

Figures 8, 8A, 9, 10:
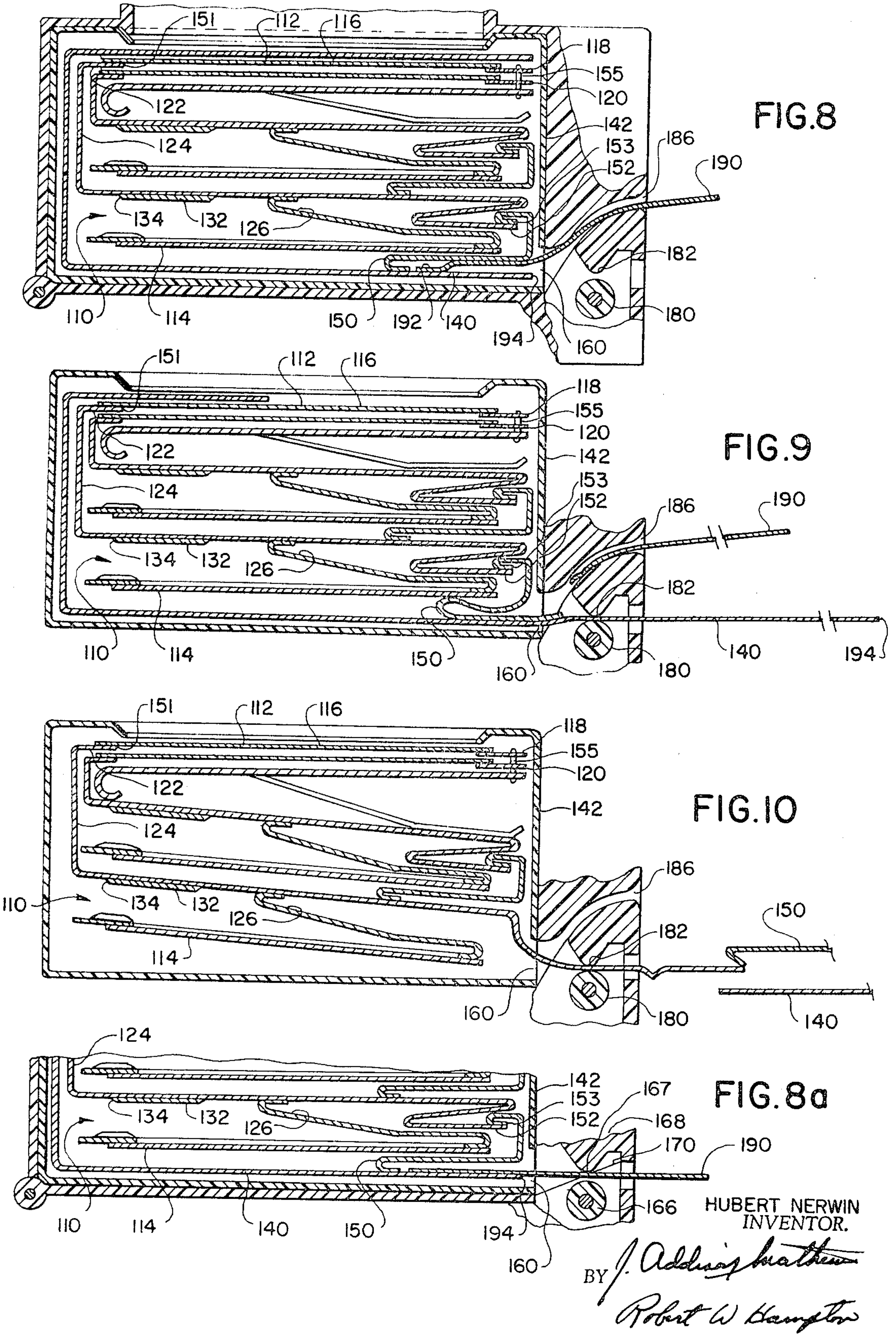
FIGS. 8–10 are exaggerated cross-sectional views of an alternative embodiment of film assemblage in accordance with the present invention.

Referring now to FIGS. 8–10, and including 8a, an alternative embodiment of the present invention is illustrated that is adapted for use in cameras either of the type described above in connection with FIGS. 1–7 or of a type wherein the pressure-applying members are not intended to be spaced apart to permit threading of the leaders therebetween. This latter type camera is illustrated, for example, in U.S. Pat. No. 3,079,849 issued on Mar. 5, 1963. As represented in FIGS. 8–10, the pressure-applying members 180 and 182 both are located on a single section of the camera, such as a cover door, that is opened upon loading of the film supply into the camera. Since the rolls do not separate from each other to permit threading of a leader therebetween, some other threading mechanism is necessary, such as the leader diverting guide 186 defined partly by the parting line between the rear and forward camera sections that separate upon opening of the camera for loading.

The film assemblage in accordance with this embodiment is substantially identical in most respects to that previously described in connection with FIGS. 1–7, and therefore has been identified by like numerals in a 100 series. One exception, however, is the additional leader 190 that has been attached to the dark slide at a position 192 spaced from the leading end 194 of the dark slide. This extends beyond the dark slide and from the assemblage at the time it is positioned in the camera. Moreover, it is adapted to cooperate with the guide means 186 of the camera to be directed upon closing of the camera into the channel defined by the guide means and to one side of both of the pressure-applying members as illustrated in FIG. 8. By pulling on this leader 190, the leading end 194 of the dark slide, which is sufficiently stiff for threading purposes, is advanced between the pressure-applying members and to a position where it may be grasped from the camera exterior. After such threading, the leader 190 is stripped away from the dark slide and may be discarded. Stripping of the leader from the dark slide in this case is permitted by an adhesive connection that again is relatively strong in shear but weak in tension. In this case, however, the leader 190 must be pulled in a direction divergent to the plane of the cover sheet, and that is the purpose of guide channel 186. The configuration of the camera and guide means 186 are such that initial pulling of the leader 190 will apply substantially only shear forces to the adhesive connection and therefore will advance the dark slide without stripping the leader therefrom. After threading of the cover sheet between the pressure members, however, the pulling force applied to connection of 190 to the cover sheet will be applied in a direction divergent from the plane defined by the cover sheet, and the resulting tensil forces applied to the adhesive connection will effect the above mentioned stripping. After stripping of leader 190 from the cover sheet, further operation of the assemblage is identical to the embodiment illustrated in FIGS. 1–7 and further explanation is not considered necessary. Brief reference is made to FIG. 8a, however, wherein a film unit in accordance with the same last described embodiment is depicted in a camera of the type illustrated in FIGS. 1–7, wherein the pressure members separate for threading, to illustrate the compatability of this type of film assemblage with either camera.

Figures 11, 12:
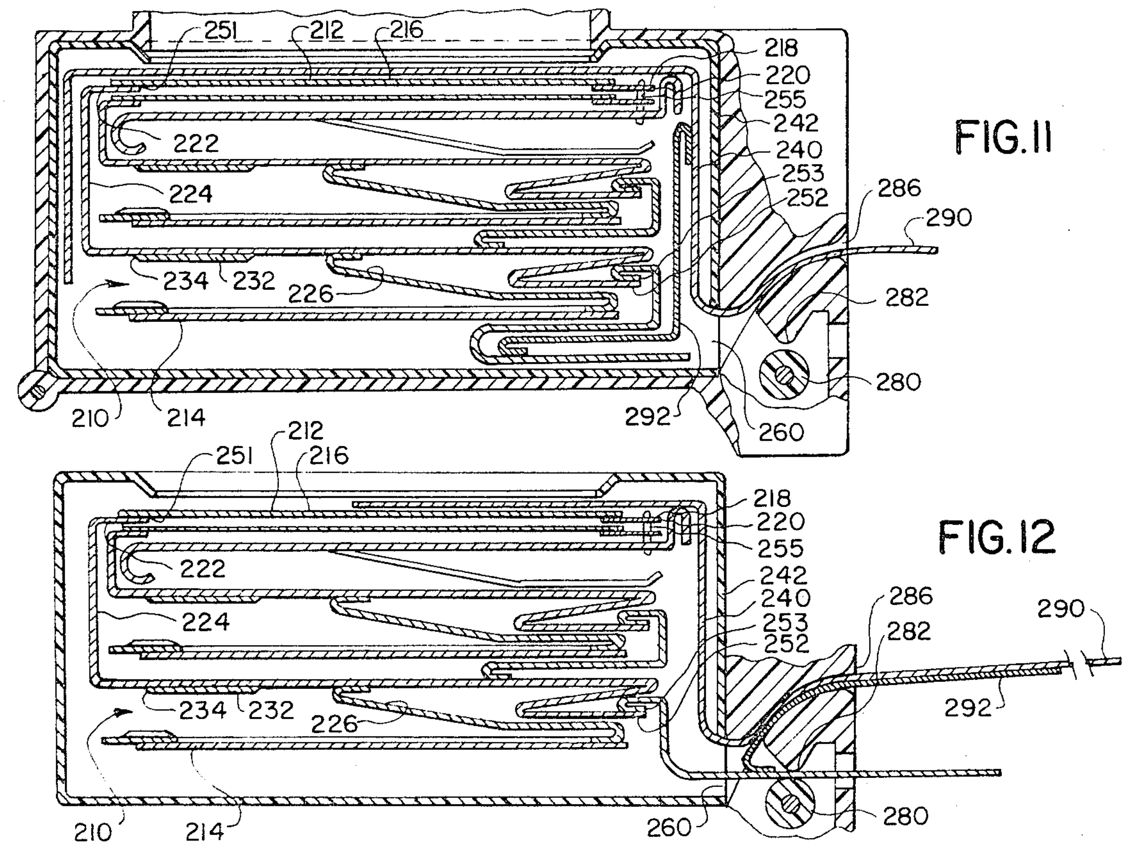
FIGS. 11 – 13 are exaggerated cross-sectional views of yet another embodiment of film assemblage in accordance with the present invention.
Figure 13:
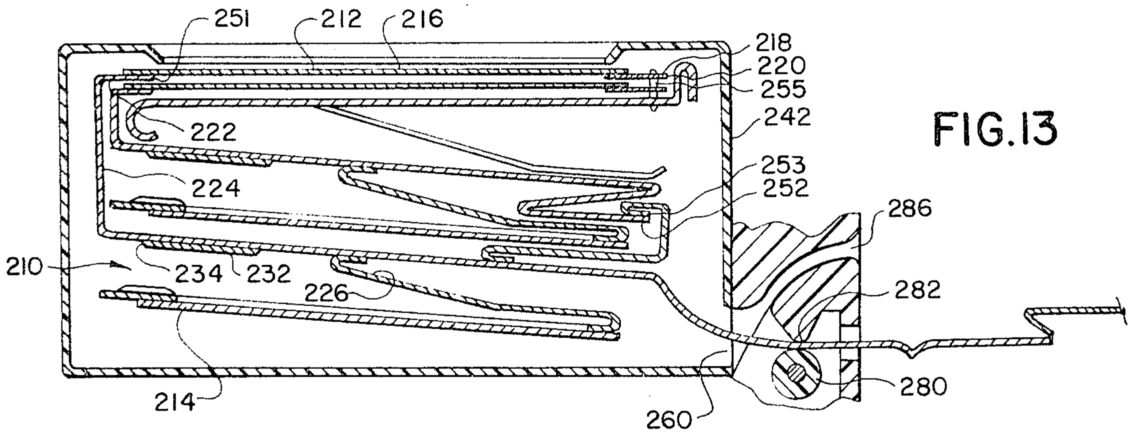

Yet another embodiment of film assemblage is illustrated in FIGS. 11–13, and has been identified by reference numerals similar to those of FIGS. 8–10 but in a 200 series. Again, as in the case of the previous embodiment, the film assemblage is adapted to be used with either of the types of cameras depicted in FIGS. 1–7 and FIGS. 8–10. This embodiment differs from those previously described in that the dark slide is adapted to be pulled in an opposite direction around the assemblage, and serves also as its own leader 290. In operation the leading end 290 of the dark slide is grasped and pulled from the assemblage to prepare the first film unit for exposure. As the dark slide is completely removed, a threading leader 292, connected at one end to the dark slide and at its other end to a leader of the first film unit, threads the last mentioned leader between the pressure members and then is stripped therefrom to be discarded with the dark slide.

Further operation of this embodiment is identical to the embodiment of FIGS. 1–7 and further explanation is not considered necessary.

The invention has been described in detail with particular reference to the illustrated preferred and alternative embodiment thereof, but it will be understood that variations and modifications can be effected within the spirit and scope of the invention.

I claim:

1. An assemblage of self-processing film units, comprising:

first and second film units, each including a photosensitive element having a leading end and adapted to record a processable latent image and a process sheet having a leading end and adapted to aid in distributing a processing fluid over said photosensitive element to effect processing of the latent image, the photosensitive elements of said first and second film units being successively positionable, the photosensitive element of said first film unit first, at an exposure position in said assemblage for exposing each photosensitive element to record the latent image;

first and second leader means coupled to said first and second film units, respectively, each of said leader means extending from the leading ends of said photosensitive element and said process sheet of its respective film unit and having a single leading end portion to which a continuous pulling force can be applied in a predetermined direction for effecting movement of said photosensitive element, said leading end thereof first, away from said exposure position and entirely from said assemblage in said predetermined direction for processing the latent image; and means releasably coupling said leading end portion of said second leader means to said first leader means at an inaccessible position within said assemblage before said movement of the photosensitive element of said first film unit away from said exposure position, said coupling means being effective, during said movement of the photosensitive element of said first film unit away from said exposure position, to render said second leader means leading end portion accessible, and thereafter to release said second leader means leading end portion from said coupling means and said first leader means.

2. An assemblage of self-processing film units as claimed in claim 1 further comprising a cartridge casing for enclosing said first and second film units, wherein said second leader means leading end portion is within said cartridge casing, and wherein said coupling means has sufficient strength, during said movement of the photosensitive element of said first film unit away from said exposure position, to withdraw said second leader means leading end portion from said cartridge casing but not to move the photosensitive element of said second film unit away from said exposure position.

3. An assemblage as claimed in claim 2 wherein said second leader means leading end portion is releasably coupled to said first leader means by a peelable joint that is strong in shear but weak in tension.

4. Photographic apparatus comprising:

a pair of juxtaposed pressure-applying members;

a film assemblage including first and second self-processing film units, each having a leading end and adapted to be exposed and processed by being moved, said leading end first, from said assemblage and between said pressure-applying members, said assemblage further including first and second leader means, extending from said leading ends of said first and second film units, respectively, and withdrawable from said assemblage and between said pressure-applying members, for moving each film unit, said leading end first, from said assemblage and between said pressure-applying members; and means releasably coupling said second leader means to said first leader means for threading said second leader means between said pressure-applying members and then for releasing said second leader means from said coupling means and said first leader means when said first leader means is withdrawn from said assemblage and between said pressure-applying members.

5. Photographic apparatus as claimed in claim 4 wherein said coupling means comprises a peelable joint defined by a portion of said first leader means folded back upon itself at said peelable joint.

6. A film assemblage comprising:

a plurality of photosensitive elements arranged in a first stack each of said photosensitive elements being adapted to be exposed and removed from said first stack for processing after exposure; and then in said a plurality of second elements arranged in a second stack and corresponding with said photosensitive elements to define respective film units, said second elements being superposable with said photosensitive elements after exposure of said photosensitive elements to assist in processing of said photosensitive elements;

a leader arrangement associated with each of said respective film units, said leader arrangement including a single pull means, extending from each film unit and withdrawable from said assemblage, first for effecting movement of one of said photosensitive and second elements into superposed relationship with the other 9and then for transporting said elements in and then for transporting said elements in and then for transporting said elements in said relationship entirely from said assemblage, both in response to pulling said single pull means; and means releasably coupling said single pull means of one of said film units to said single pull means of another of said film units, prior to said movement of said photosensitive and second elements into said superposed relationship, first for withdrawing said single pull means of said one film unit from said assemblage and then for releasing said single pull means of said one film unit from said coupling means and said single pull means of said another film unit in response to withdrawal of said single pull means of said another film unit from said assemblage.

7. A film assemblage as claimed in claim 6 further comprising a cartridge casing containing said film units, said casing having an exit opening through which said film units are sequentially transportable by their respective single pull means, said single pull means of said one film unit being automatically threaded through said exit opening in response to withdrawal of said single pull means of said another film unit through said exit opening.

8. A film assemblage as claimed in claim 7 wherein said single pull means of each film unit comprises a leader extending between said photosensitive element and said second element of the corresponding film unit, said leader being folded twice upon itself in a generally Z-shaped configuration between said elements.

9. Photographic apparatus comprising:

a pair of juxtaposed pressure-applying members; and an assemblage of self-processing film units, each having a leading end and adapted to be exposed and then processed by being moved, said leading end first, from said assemblage and between said pressure-applying members, said assemblage including:

a plurality of photosensitive elements arranged in a first stack, said photosensitive elements being adapted to be exposed and then moved from said first stack for processing;

a plurality of second elements arranged in a second stack and corresponding with said photosensitive elements to define said film units, said second elements being superposable with said photosensitive elements after exposure to assist in the processing;

a leader arrangement including a single pull means extending from said leading end of each film unit and movable between said pressure-applying members for effecting movement of one of said photosensitive and second elements into superposed relationship with the other and for then moving said elements when superposed between said members; and means releasably coupling said single pull means of one of said film units to said single pull means of another of said film units, prior to said movement of said elements into said superposed relationship, first for threading said single pull means of said one film unit between said pressure-applying members and then for releasing said single pull means of said one film unit from said coupling means and said single pull means of said another film unit in response to movement of said single pull means of said another film unit between said members.

10. A film assemblage comprising:

first and second self-processing film units, each having a leading end and including a photosensitive element for recording a latent image and a process sheet for aiding in processing of the latent image; and a leader arrangement for sequentially transporting said film units, said first film unit first, from said assemblage, said leader arrangement including first single pull means, extending from the leading end of said first film unit and movable from said assemblage, for transporting said first film unit, said leading end thereof first, entirely from said assemblage, second single pull means, extending from the leading end of said second film unit and movable from said assemblage, for transporting said second film unit, said leading end thereof first, entirely from said assemblage, and means releasably coupling said second single pull means to said first single pull means, said coupling means having sufficient strength to move at least a portion of said second single pull means from said assemblage with said first single pull means during movement of said first single pull means from said assemblage but insufficient strength to transport said second film unit from said assemblage, said second single pull means being automatically released from said coupling means and said first film single pull means after said at least a portion of said second single pull means is moved from said assemblage.

11. A film assemblage as claimed in claim 10 wherein said second single pull means is releasably coupled to said first single pull means before said movement of said first single pull means is initiated.

* * * * *

PO-1050
(5/69)

UNITED STATES PATENT OFFICE
CERTIFICATE OF CORRECTION

Patent No. 3,745,900 Dated July 17, 1973

Inventor(x) Hubert Nerwin

It is certified that error appears in the above-identified patent and that said Letters Patent are hereby corrected as shown below:

In the Abstract, lines 10 and 11, "elements" should read --element--; line 16, "grapsed" should read --grasped--. In Col. 5, line 14, "full" should read --fully--. In Col. 14, lines 28 and 29, "and then in said" should not appear; line 43, "9" should not appear; lines 44 and 45, "and then for transporting said elements in and then for transporting said elements in" should not appear.

Signed and sealed this 20th day of November 1973.

(SEAL)
Attest:

EDWARD M.FLETCHER,JR.
Attesting Officer

RENE D. TEGTMEYER
Acting Commissioner of Patents